United States Patent
Miyazaki (10) Patent No.: US 7,577,450 B2
(45) Date of Patent: Aug. 18, 2009

(54) WIRELESS COMMUNICATION DEVICE AND CONTROL METHOD THEREFOR

(75) Inventor: Yoshio Miyazaki, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 356 days.

(21) Appl. No.: 11/387,450

(22) Filed: Mar. 23, 2006

(65) Prior Publication Data

US 2006/0217125 A1 Sep. 28, 2006

(30) Foreign Application Priority Data

Mar. 24, 2005 (JP) ............................. 2005-087190

(51) Int. Cl.
*H04W 72/00* (2006.01)
*H04B 7/00* (2006.01)
*H04B 1/00* (2006.01)

(52) U.S. Cl. .................. 455/464; 455/63.1; 455/452.2; 455/453; 455/509

(58) Field of Classification Search ................ 455/41.2, 455/62, 63.1, 67.11, 67.7, 68, 103, 158.1, 455/166.1, 226.1–226.2, 434, 452.1–452.2, 455/453, 455, 463–464, 509–517, 528, 1, 455/114.2, 188.1, 278.1, 296, 446–451, 550.1, 455/556.2, 560–561; 370/450, 454, 459; 375/150, 316, 346, E1.021

See application file for complete search history.

(56) References Cited

U.S. PATENT DOCUMENTS

| 5,809,427 | A  | * | 9/1998 | Perreault et al. ............ 455/513 |
| 6,707,862 | B1 | * | 3/2004 | Larsson ..................... 375/326 |
| 7,305,237 | B2 | * | 12/2007 | Stephens .................... 455/434 |
| 7,372,894 | B2 | * | 5/2008 | Rached et al. .............. 375/148 |
| 2003/0156556 | A1 | * | 8/2003 | Puig-Oses et al. ........... 370/328 |
| 2005/0020273 | A1 | * | 1/2005 | Fong et al. .................. 455/453 |
| 2005/0164724 | A1 | * | 7/2005 | Marinier et al. ............. 455/515 |
| 2005/0266803 | A1 | * | 12/2005 | Dinur et al. ................ 455/67.7 |
| 2006/0109806 | A1 | * | 5/2006 | Kwak et al. ................. 370/310 |

FOREIGN PATENT DOCUMENTS

| JP | 64-080135 | 3/1989 |
| JP | 2001-036490 | 2/2001 |
| JP | 2003-009229 | 1/2003 |
| JP | 2003-319448 | 11/2003 |

* cited by examiner

*Primary Examiner*—Meless N Zewdu
(74) *Attorney, Agent, or Firm*—Katten Muchin Rosenman LLP (57) ABSTRACT

A wireless communication device for carrying out wireless communication using any one of a plurality of channels, wherein for at least some of the plurality of channels, energy threshold values for determining whether or not a channel is busy is set for each channel. With respect to these energy threshold values, generally an energy threshold value set in at least one channel is set different to an energy threshold value set in another channel.

5 Claims, 5 Drawing Sheets

| ENERGY THRESHOLD VALUE | SELECTABLE COMMUNICATION SPEED |
|---|---|
| aaaa | 11Mb/s, 5.5Mb/s, 2Mb/s |
| bbbb | 11Mb/s, 5.5Mb/s, 2Mb/s |
| ⋮ | ⋮ |
| nnnn | 11Mb/s, 5.5Mb/s |
| ⋮ | ⋮ |
| xxxx | 11Mb/s |

| ENERGY THRESHOLD VALUE | SELECTABLE COMMUNICATION SPEED |
|---|---|
| aaaa | 11Mb/s, 5.5Mb/s, 2Mb/s |
| bbbb | 11Mb/s, 5.5Mb/s, 2Mb/s |
| ⋮ | ⋮ |
| nnnn | 11Mb/s, 5.5Mb/s |
| ⋮ | ⋮ |
| xxxx | 11Mb/s |

WIRELESS COMMUNICATION DEVICE AND CONTROL METHOD THEREFOR

BACKGROUND OF THE INVENTION

1. Field of the Invention

The present invention relates to a wireless communication device such as a wireless LAN (Local Area Network), and to a control method for such a device.

2. Description of the Related Art

Conventionally, it has been easy to configure a LAN, and Wireless LANs have been drawing attention due to their advantages, such as the fact that is possible to easily connect mobile terminals such as mobile game terminals, for example, to a network at outside destinations.

With this type of wireless LAN, communication is carried out by selectively using one of a plurality of frequency bands (channels), and in order to determine whether or not a channel is busy (in a state of being used by another user) a method of detecting energy level of a signal received at the frequency band of the channel or a method of detecting a carrier is used.

Of these methods, the method of detecting a carrier can reliably detect the presence or absence of a user compared to the method of detecting energy level, but is characterized in that a long time is taken until detection. On the other hand, the method of detecting energy level has low detection precision at points where it detected that another user is communicating, even if there is no other user communicating, if the energy level of a received signal is high in a channel frequency band due to noise etc. generated in the ambient surroundings.

On the other hand, in a portable game machine, it is necessary to send and receive information relating to the game in real time. For that reason, as a method for determining whether transmission of information is possible, confirmation of the fact that another user is communicating by the method of detecting a carrier is not realistic because a comparatively long time is taken for detection with this method.

However, in the case where the method using energy level is adopted, there are the following problems. That is, in recent years game machines have also become highly function rich, and this itself leads to a lot of noise sources, meaning there are a lot of erroneous detections due to setting of energy levels, and it can be assumed that communication opportunities will be compromised.

SUMMARY OF THE INVENTION

The present invention has been conceived in view of the above described situation, and an object of the invention is to provide a wireless communication device that can detect whether or not transmission of information is possible in a comparatively short time, and can reduce erroneous detection, and a control method for such a device.

One aspect of the present invention is a wireless communication device for carrying out wireless communication using one of a plurality of channels, wherein for at least some of the channels, an energy threshold value is set for each channel in order to determine whether or not a channel is busy, and an energy threshold value that has been set in at least one channel is different to an energy threshold value set in other channels.

A further aspect of the present invention is a control method for a wireless communication device for carrying out wireless communication using one of a plurality of channels, wherein for at least some of the channels, an energy threshold value for determine whether or not each channel is busy is set by determining for each of at least some of the channels based on a predetermined method.

DESCRIPTION OF THE PREFERRED EMBODIMENT

Embodiments of the present invention will now be described with reference to the drawings. In the following, a wireless communication device of this embodiment will be described for an example implemented as a portable game machine, but this is not limiting. With this embodiment, for example, even if noise is generated by devices inside the game device body, as this wireless communication device, attention is paid to the fact that there is a frequency response in the noise, it is possible to set energy level threshold values (energy threshold values) for determining whether or not another using is carrying out communication differently for each channel, according to the frequency response of the noise.

With the related art, this energy threshold value was set the same for all channels. That is, if a channel that is not affected by noise and a channel that is affected by noise have the same value, for example, if energy threshold value is set with a channel that is not affected by noise as a reference, then in the channel that is affected by noise there will be a lot of signal received that exceed the energy threshold value, because of the noise, and opportunities for communication will be lost.

Conversely, according to the wireless communication device of this embodiment, it is possible to set mutually different energy threshold values for a channel that is affect by noise and a channel that is not affected by noise. That is, it is possible to set energy threshold values for each channel taking into consideration the circumstances of each channel.

Figure 1:
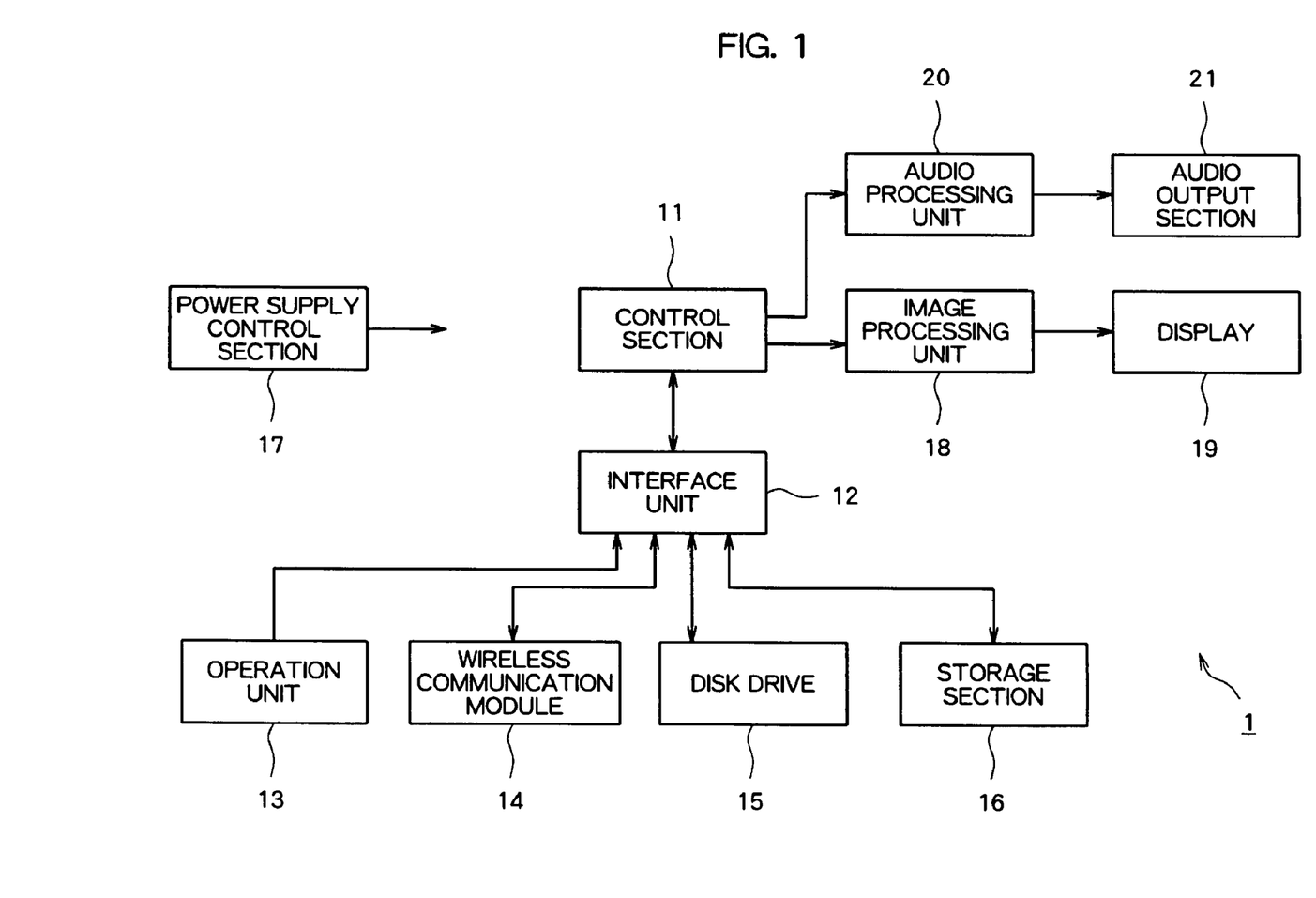
FIG. 1 is a structural block diagram of a portable game machine, being one example of a wireless communication terminal of an embodiment of the present invention.

In the following, the structure and operation will be described for a portable game unit as a portable communication device of this embodiment. As shown in FIG. 1, showing a schematic, this portable game unit comprises a control section 11, an interface unit 12, an operation unit 13, a wireless communication module 14, a disk drive 15, a storage section 16, a power supply control section 17, an image processing unit 18, a display 19, an audio processing unit 20 and an audio output section 21.

Here, the operation unit 13, wireless communication module 14, disk drive 15 and storage section 16 are connected to the control section 11 via the interface unit 12. Also, the power supply control section 17, image processing section 18 and audio processing unit 20 are connected to the control section 11, while the display 19 is further connected to the image processing unit 18. The audio output section 21 is also connected to the audio processing unit 20.

The control section 11 is an MPU (micro processing unit) or the like, and is operating in accordance with a program stored in an external storage medium inserted in the disk drive 15, or the storage section 16. The interface unit 12 outputs signals output by the control section to the wireless communication module 14, disk drive 15 and storage section 16 in a divided manner according to instructions input from the control section 11. This interface unit 12 also outputs signals to the control section 11 from the operation unit 13, wireless communication module 14, disk drive 15 and storage section 16 to the control section 11 while respectively arbitrating.

The operation unit 13 includes game operation buttons and setting buttons. By operating each type of button included in the operation unit 13, the player performs operation of the game. The operation unit 13 outputs signals representing the content of a player operation to the interface unit 12.

The wireless communication module 14 is a wireless communication device conforming to, for example, 802.11b or g, and transmits data for transmission by wireless emission in accordance with instructions input from the control section 11. Also, signals reaching an antenna (not shown) are received and output to the control section 11. This wireless communication module 14 also executes processing for selecting a channel to be used, and processing for confirming that there is no transmission of data by another device in the channel being used, etc. The specific structure of this wireless communication module 14 and contents of processing will be described in detail later.

The disk drive 15 reads out data from an externally mounted storage medium using instructions input from the control section 11, and outputs to the control section 11. The storage section 16 has storage elements such as RAM and ROM, holds programs executed by the control section 11, and also operates as a working memory for the control section 11.

The power supply control section 17 supplies power to each section. The image processing unit 18 renders images to be displayed on the display 19 in accordance with instructions input from the control section 11, and outputs image signals for displaying the rendered image to the display 19. The display 19 is, for example, a liquid crystal display, and displays images by controlling liquid crystal based on image signals input from the image processing unit 18.

The audio processing unit 20 synthesizes audio in accordance with instructions from the control section 11, and outputs the synthesized audio signals to the audio output section 21. Here audio represents, for example, beep sounds and music, and also various sounds such as people's voices. The audio output section 21 has speakers and headphone terminals, and drives speakers based on audio signals output from the audio processing unit 20, while also outputting the audio signals to the headphone terminals.

Figure 2:
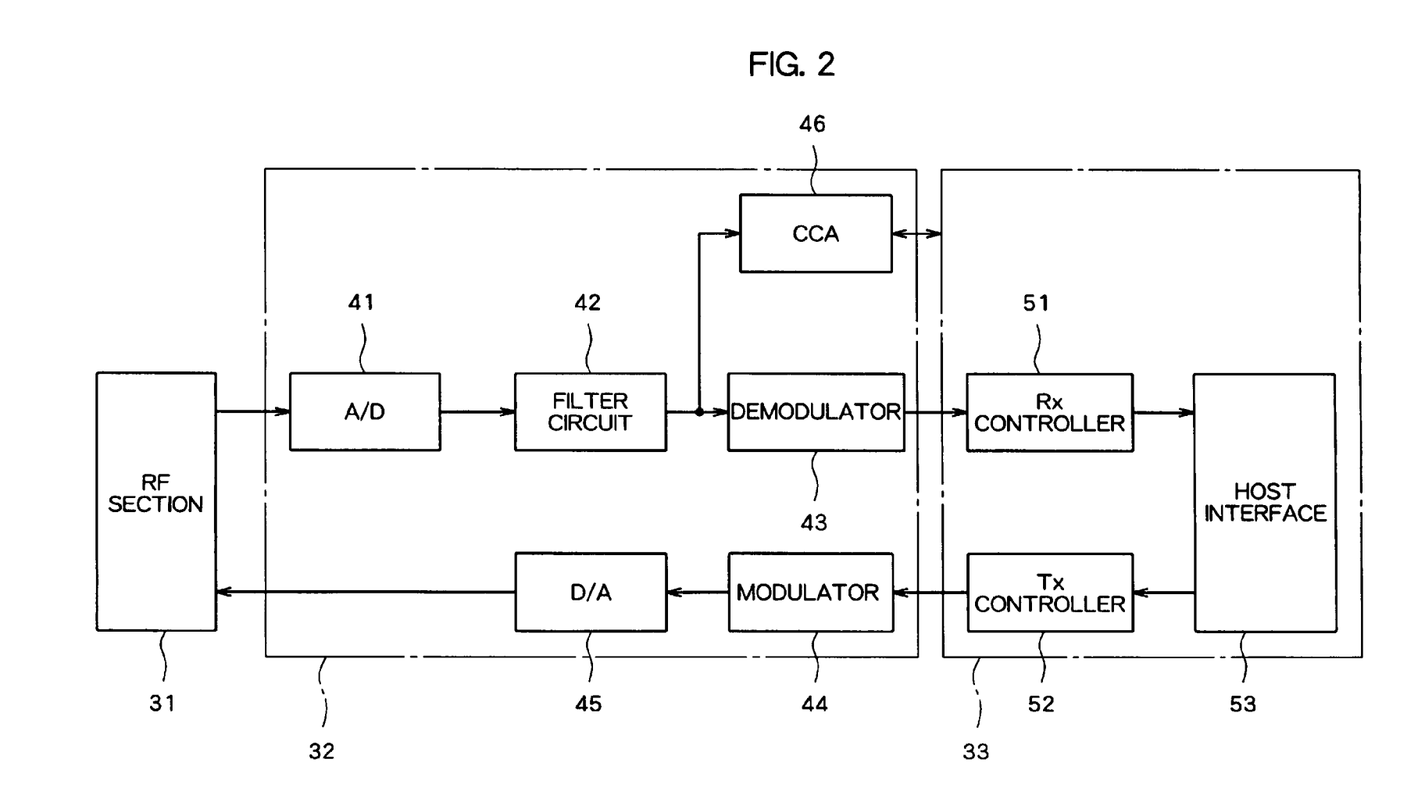
FIG. 2 is a functional block diagram showing an example of a wireless communication module of an embodiment of the present invention.

Here, a specific structural example and operating example of the wireless communication module 14 will be described. As shown in FIG. 2, the wireless communication module 14 of this embodiment comprises an RF section 31, a base band section 32 and a control section 33. Also, the base band section 32 comprises an analog/digital (AD) converter 41, a filter circuit 42, a demodulator 43, a modulator 44, a digital/analog (DA) converter 45, and a CCA (clear channel assessment) circuit 46. The control section 33 comprises a receive (Rx) controller 51, a transmit (Tx) controller 52, and a host interface 53.

The RF section 31 converts analog signals output by the base band section 32 to signals in a wireless frequency band (RF) of the selected channel, and transmits the signals. The RF section 31 also receives signals in a wireless frequency band of the selected channel, and output to the base band section 32. Channel selection is carried out from the control section 11, at a host side, via the control section 33.

The AD converter 41 of the base band section 32 converts signals received at the RF section 31 to digital signals and outputs them. The filter circuit 42 subjects the signals output by the AD converter 41 to predetermined digital filter processing and outputs the result. The demodulator 43 demodulates data from digital signals output by the filter circuit 42, and outputs to the control section 33.

The modulator 44 modulates data input from the control section 33, and outputs the result. The DA converter 45 converts a digital signal obtained through modulation in the modulator 44 to analog signals, and outputs the analog signals to the RF section 31.

The CCA circuit 46 holds energy threshold values set via the control section 33. Also, this CCA circuit 46 receives input of digital signals output by the filter circuit 42, and calculates an energy level of the digital signals. Then, when the energy level does not exceed a set energy level threshold value, it is determined that the channel currently being received is clear (state where there is no terminal communicating with another) while when the energy threshold is exceeded it is judged that the currently received channel is not clear (state where there is a terminal communicating with another). A clear assessment signal indicating the results of judgment is then output to the Rx controller 51 and the Tx controller 52 of the control section 33.

When the channel currently being received is not clear, as a result of the clear assessment signal input from the CCA circuit 46, the Rx controller 51 of the control section 33 extracts address information from the data output by the demodulator 43, and if the extracted data matches preset address information the data is output to a host interface 53.

If data for transmission is input from the host interface 53 side, the Tx controller 52 determined whether or not the channel to be used (channel currently being received) is clear using the clear assessment signal input from the CCA circuit 46, and in the event that the channel is clear outputs data for transmission to the modulator 44. This Tx controller 52 is provided with a buffer memory, and when a channel to be used is not clear the data for transmission is held as is in the buffer memory, waiting until the channel becomes clear. At this time, if a state where the amount of input data cannot be held in the buffer memory arises, a signal indicating that the memory is full is output to the host side.

The host interface 53 outputs data input from the Rx controller 51 to the control section 11 that is the host. Also, if data for transmission is input from the control section 11, this host interface 53 outputs the data to the Tx controller 52. Further, this host section 53 receives input of instructions for selecting a channel that is to be used from the control section 11, and instructs to carry out communication in a selected channel frequency band to the RF section 31. The host interface 53 also receives instruction for an energy threshold value for the CCA circuit 46 and that fact that the energy threshold value should be set, from the control section 11, and outputs the energy threshold value contain in the instruction to the CCA circuit 46 to set that energy threshold value. This host interface 53 also outputs a clear assessment signal output by the CCA circuit 46 to the control section 11.

Figure 3:
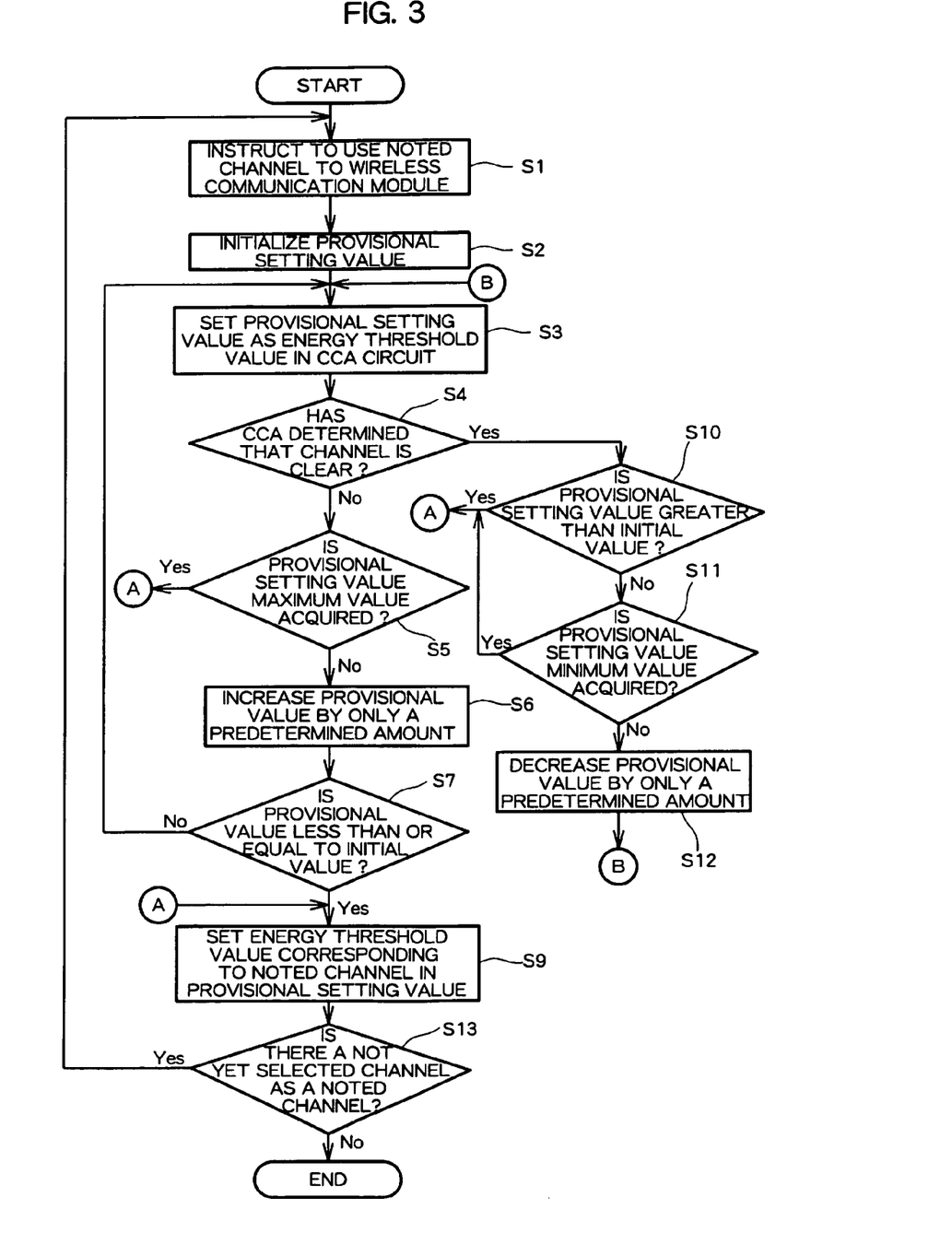
FIG. 3 is a flowchart showing an example of a threshold value setting processing of an embodiment of the present invention.

Next, operation of the control section 11 of this embodiment will be described. The control section 11 executes processing for determining energy threshold value for each channel, as shown in FIG. 3, at a predetermined time (time of commencing execution of software read out by the disk drive 15, for example). This processing sets one channel that a selectable channel but not yet selected as a noted channel, and outputs an instruction to select the noted channel as a channel to be used to the wireless communication module 14 (S1).

The control section 11 initializes the provisional value to a predetermined initial value (for example a value recommended by the maker of the wireless communication module) (S2). This provisional value is set in the CCA circuit 46 as an energy threshold value (S3). At this time, the control circuit 11 performs controls that put a high load of the system, such as driving the disk drive 15, and carrying out display by switching a plurality of images in the image processing unit 18, and controls each section to increase noise levels generated from the system.

The control section 11 references the clear assessment signal output by the CCA circuit 46 to check whether or not the channel is clear (S4). Here, in the event that it is determined that the channel is not clear (No), it is checked whether or not the provisional value becomes a maximum value that can be set as an energy threshold value (S5). In this process S5, if it has not become a maximum value, the provisional value is increased by a predetermined amount (S6). For example, in the case where one of a plurality of candidate values discretely set in advance is selected as an energy threshold value, the level set in the provisional value is increased by one to set a one step higher threshold value. The control section 11 checks whether or not the provisional value has become less than or equal to an initial value (S7), and if it is not less than or equal to the initial value (No), process S3 is returned to and processing continues.

On the other hand, if the provisional value becomes less than or equal to the initial value in process S7, the provisional value is determined to be an energy threshold for the noted channel, information specifying the noted channel and the provisional value are stored in a correlated fashion in the storage section 16 (S9), and processing transfers to S13.

Also, in process S5, also in the event that the provisional value becomes a maximum value that can be set as an energy threshold value, processing transfers to process S9 (A), and the maximum value is determined as an energy threshold value for the noted channel.

If it is determined that the channel is clear in process S4 (Yes), the control section 11 transfers to process S9, and it possible either to set the provisional value at the point in time where it was determined that the channel is clear as an energy threshold value for the noted channel, or to lower the level of the provisional value by one, set to a value one step lower and repeat processing to set the energy threshold value. When carrying out energy value setting in this way, the control section 11, when it is determined in process S4 that the channel is clear (Yes), determines whether or not the provisional value exceeds an initial value (S10), and in the event that the provisional value does exceed the initial value processing transfers to process S9. Also, if the provisional value does not exceed the initial value, it is checked whether or not the provisional value has become a minimum value that can be set as an energy setting value (S11). In this process S11, if it has become a minimum value, processing transfers to process S9.

The control section 11 reduces the provisional value by a predetermined amount if it is determined in process S11 that the provisional value has not reached a minimum value that can be set as an energy setting value (S12). For example, in the case where one of a plurality of candidate values discretely set in advance is selected as a lower threshold value, the level set in the provisional value is decreased by one to set a one step lower threshold value. The control section 11 then transfers to process S3 and processing continues (B).

If an energy threshold value for the noted channel is determined in process S9, the control section 11 checks whether or not there is a channel that has not yet been selected as a noted channel (S13) In this process S13, if there is a not yet selected channel, processing returns to S1 and continues. Also, if there is no unselected channel in step S13, processing is terminated.

That is, with this processing, among energy threshold values of a plurality of steps, erroneous decision energy threshold values that erroneously determine that the channel is busy are detected, and energy threshold values that determine that the channel is not busy, being energy threshold values of steps in the vicinity of the erroneous decision energy threshold values due to internal noise of this game machine, are detected.

Figure 4:
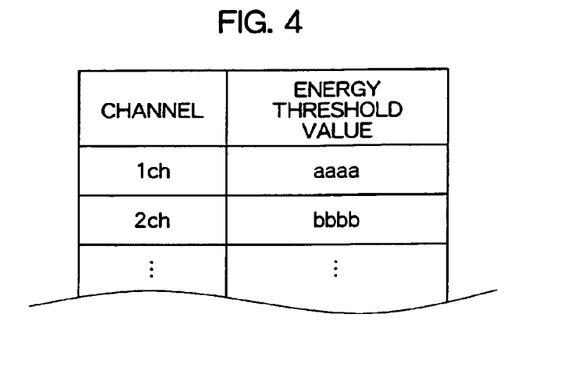
FIG. 4 is an explanatory drawing showing a setting example for energy threshold value stored for each channel, in an embodiment of the present invention.

Using this processing of the control section 11, it is possible to respectively set energy threshold values to be used with each channel. Also, the control section 11 correlates information for identifying a channel and a determined energy threshold value, for each channel, and stores in the storage section 16 (FIG. 4).

Generally, the effects of system noise are different depending on the channel, which means that a different energy threshold value is set for each channel. Specifically, an energy threshold being set in relation to at least one channel is set different to an energy threshold value set in another channel.

Here, description has been given for an example where an energy threshold value is set to one of a plurality of discretely determined candidate values, but the energy threshold values can also be set as continuous values.

Also, description is given here of an example where processing from S2 to S12 is repeatedly carried out for all selectable channels, and energy threshold values are set for all selectable channels, but instead of this, it is also possible to, as a channel used in wireless communication, to make previously set usage channel as a noted channel and to determine an energy threshold value for only the noted channel.

It is possible to carry out processing shown in FIG. 3 for only some predetermined channels from among the selectable channels. For example, in the event that there are channels from 1 to 14, it is possible to execute the above-described processing of FIG. 3 for only odd numbers channels 1, 3, 5 . . . to set respective energy threshold values, and for even numbered channels adjacent to these channels energy threshold values of a channel adjacent on one side are set as is. It is further possible to divide the selectable channels into respective groups and to execute the processing of FIG. 3 in at least one channel belonging to the group, and to determined and set an energy threshold level for each group. In this case, when setting of energy threshold value for a plurality of channels is carried out from a group, it is possible to set a statistical operation value for each setting result (for example, an average) as a group energy threshold value.

If there is a usage channel selection operation from a user, the control section 11 outputs an instruction that a selected channel should be used to the wireless communication section 14, and referring to a threshold value table stored in the storage section 16 reads out an energy threshold value setting value corresponding to the selected channel, and outputs the read-out energy threshold value setting value to the wireless communication section to set the energy threshold value for the CCA circuit 46. In this way, while a signal exceeding the set energy threshold value is being received in the selected channel, signal transmission is restricted.

When an energy threshold value is determined for each group, an energy threshold value relating to a group to which a selected channel belongs is acquired, and a setting value for the energy threshold value is output to the wireless communication module 14 to set the energy threshold value for the CCA circuit 46.

[Change of Communication Speed Setting Value]

It is also possible for the control section 11 of this embodiment to correlate setting of energy threshold values to set communication parameters relating to other wireless communication.

Figure 5:
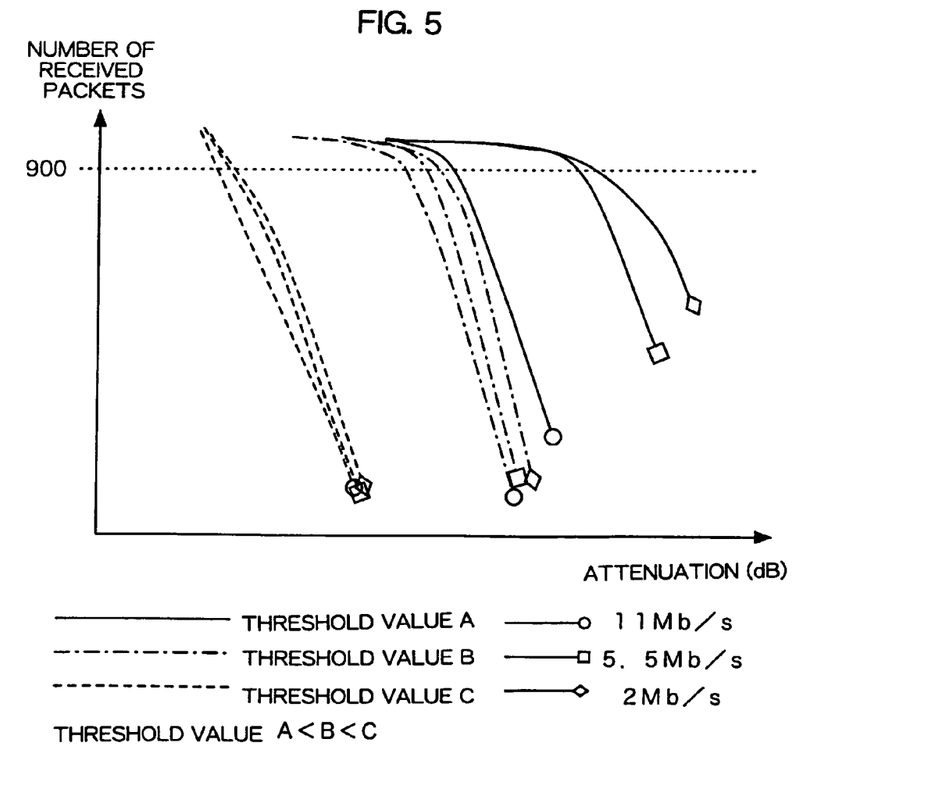
FIG. 5 is an explanatory drawing showing the outline of measurement results for delivered packet amount with respect to signal attenuation for each energy threshold value and communication speed.

For example, FIG. 5 is an explanatory drawing showing the outline of measurement results for delivered packet amount (number of delivered packets per 1,000 packets) with respect to signal attenuation (dB) for each energy threshold value and communication speed.

With FIG. 5, threshold values A, B and C represent a case where threshold value increases in the order A<B<C. From the measurement results, when the threshold value is low (equivalent to threshold value A (solid line) in FIG. 5), generally sensitivity is high (even if a signal is attenuated significantly, packet loss is low), and respective differences in sensitivity are large as communication speed changes to 2 Mb/s, 5.5 Mb/s, and 11 Mb/s.

On the other hand, if threshold value is raised (equivalent to threshold B (chain line) in FIG. 5), sensitivity is generally lowered (effect where communication is mistakenly carried out even though noise level is high, sensitivity reduced), and differences in sensitivity as communication rate is changes are small. If threshold value is raised further (equivalent to threshold C (dashed line) in FIG. 5)) sensitivity is lowered further, and differences in sensitivity as communication speed is changed become even smaller. That is, if threshold value is raised, communication sensitivity cannot be improved, even if communication sensitivity is lowered.

Figure 6:
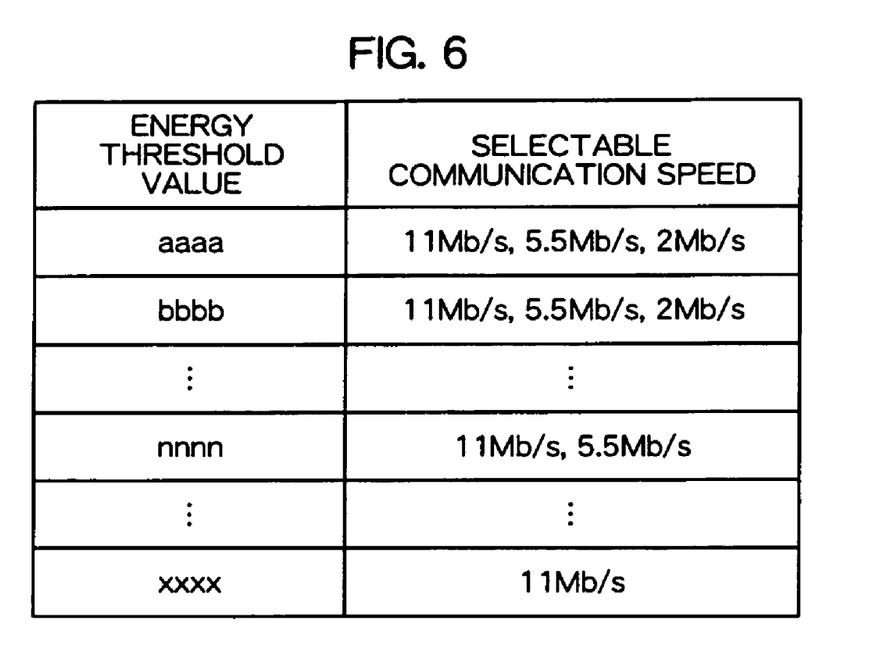
FIG. 6 is an explanatory drawing showing an example of a table with setting values for selectable communication speeds correlated to energy threshold value.

With this embodiment, therefore, selectable communication speed setting values are determined based on energy threshold values. For example, as shown in FIG. 6, a table correlating selectable communication speed setting values to values for an energy threshold value is stored in the storage section 16. Here, as energy threshold values become high, selectable communication speed setting value is restricted. This is because in a region where energy threshold values are high, it is ineffective even if the communication speed is changed. At this time, there is restriction to setting values for highest possible speed communication. This is in order to carry out communication as fast as possible because there is inefficiency even if communication speed is changed.

When starting communication, the control section 11 references energy threshold values set for channels used in communication and reads out selectable communication speed setting values, correlated to values for the energy threshold values.

The control section 11 commences communication with one of the read communication possible setting values, for example a maximum value, as an initial value. Also during communication, if it is detected that sensitivity becomes less than a predetermined first sensitivity threshold value, the control section 11 checks if there is a value among the read out communication speed setting values that is smaller than the current value. If there is, the communication speed setting value is set to a one step smaller value. For example, in the case where communication speed setting values are "11", "5.5" and "2", and the current value is "11", the value is set to "5.5". Communication at the set communication speed is then started.

Also, if it is detected that sensitivity exceeds a predetermined second sensitivity threshold value during communication, the control section 11 performs setting of the communication speed setting value to a value one step larger if there is a value amount the read out communication setting values that us larger than the current value. For example, in the case where communication speed setting values are "11", "5.5" and "2", and the current value is "2", the value is set to "5.5". Communication at the set communication speed is then started. In doing this, it is possible to set communication speed in line with energy threshold value.

According to this embodiment, when carrying out wireless communication, an energy threshold value for determining advisability of wireless communication is set for each channel according to frequency response of noise in the device itself. For this reason, it is possible to reduce erroneous detection taking into consideration characteristics of each channel, and it is possible to detect whether or not transmission is possible in a comparatively short time by using energy threshold values.

The description so far has been given for an example where a control section 11 of a wireless communication device carries out processing to set energy threshold values, but it is also possible to set energy threshold values at the stage of manufacturing the wireless communication device. In this case, a device (setting unit) for carrying out setting of energy threshold values is connected to the wireless communication device, processing shown in FIG. 3 is executed by this setting unit, and a table having energy threshold values determined for each channel is stored in the storage section 16 of the wireless communication device.

In this case, the control section 11 acquired energy threshold values for channels used in communication by referencing this table, and sets them in the wireless communication module 14. With type of example where energy threshold values are set using a setting device at the time of manufacture, it is not necessary for the control section 11 to execute processing to set energy threshold values.

What is claimed is:

1. A communication apparatus, comprising:
a wireless communication device for carrying out wireless communication using one of a plurality of channels, wherein
for at least some of the plurality of channels, an energy threshold value is set for each channel in order to determine whether or not a respective channel is busy, and wherein an energy threshold value that has been set in at least one channel, in the at least some of the plurality channels is different from an energy threshold value set in other channels of the at least some of the plurality of channels; and wherein, among selectable communication speed setting values are determined for the at least some of the plurality of channels based on the energy threshold values, and a selectable communication speed setting value, that has been determined in at least one channel, in the at least some of the plurality of channels, is different from a selectable communication speed setting value determined in other channels of the at least some of the plurality of channels.

2. The communication apparatus of claim 1, wherein the energy threshold values are set by selecting any one of a plurality of candidate energy threshold values.

3. A wireless communication device for carrying out wireless communication using one of a plurality of channels, comprising:
- a diving and setting section for dividing each of said plurality of channels into a plurality of groups, and for setting energy threshold values for determining whether or not a channel is busy in each of the groups,
- a selecting section for selecting a channel used in wireless communication, and
- an acquiring and control section for acquiring an energy threshold value being set in a group corresponding to the selected channel, and carrying out control so that signal transmission is restricted while a signal in excess of the acquired energy threshold value is being received in the selected channel.

4. An apparatus for wireless communication, comprising:
a wireless communication device for carrying out the wireless communication selectively using one of a plurality of channels, wherein the device determines when a selected channel is not busy using one of energy threshold values, the energy threshold values are arranged as different steps in the plurality of channels, and wherein the device detects a first energy threshold value step which causes erroneous determination that a respective channel, in the plurality of channels is busy, detects a second energy threshold value step that is adjacent to the first energy threshold value step, and sets the second energy threshold value step for determining whether or not the selected channel is busy.

5. A method for carrying out wireless communication using one of a plurality of channels in a wireless communication device including a controller, comprising:
- dividing by the controller each of said plurality of channels into a plurality of groups, wherein energy threshold values are set for determining whether or not a channel is busy for each of the plurality of groups,
- selecting by the controller a channel used in the wireless communication, and
- acquiring by the controller an energy threshold value set in a group in the plurality of groups corresponding to the selected channel, and carrying out control so that a signal transmission is restricted while a signal in excess of the acquired energy threshold value is being received in the selected channel.

* * * * *